US009516555B2

(12) United States Patent
Vikberg et al.

(10) Patent No.: US 9,516,555 B2
(45) Date of Patent: Dec. 6, 2016

(54) METHODS IN A BASE STATION FOR HANDLING HANDOVER, BASE STATION, COMPUTER PROGRAM AND COMPUTER PROGRAM PRODUCT

(75) Inventors: Jari Vikberg, Järna (SE); Tomas Hedberg, Stockholm (SE); Tomas Nylander, Värmdö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 158 days.

(21) Appl. No.: 14/115,810

(22) PCT Filed: May 6, 2011

(86) PCT No.: PCT/SE2011/050570
§ 371 (c)(1),
(2), (4) Date: Nov. 5, 2013

(87) PCT Pub. No.: WO2012/154089
PCT Pub. Date: Nov. 15, 2012

(65) Prior Publication Data
US 2014/0087735 A1 Mar. 27, 2014

(51) Int. Cl.
*H04W 36/00* (2009.01)
(52) U.S. Cl.
CPC ..... *H04W 36/0011* (2013.01); *H04W 36/0055* (2013.01)
(58) Field of Classification Search
None
See application file for complete search history.

(56) References Cited

U.S. PATENT DOCUMENTS

2010/0167744 A1* 7/2010 Grob-Lipski ..... H04W 36/0088
455/436
2011/0028171 A1* 2/2011 Guo et al. ..................... 455/502

FOREIGN PATENT DOCUMENTS

WO 2010036161 A1 4/2010
WO WO 2010036161 A1 * 4/2010 ............ H04W 36/08

OTHER PUBLICATIONS

Author Unknown, "[66#9] LTE-UMTS: Inbound Mobility to CSG Cell from LTE Cell," 3GPP TSG-RAN WG2#66bis; R2-093920; Jun. 29-Jul. 3, 2009. pp. 1-28. Los Angeles, CA, USA.

(Continued)

*Primary Examiner* — Kwasi Karikari
(74) *Attorney, Agent, or Firm* — Patent Portfolio Builders, PLLC

(57) ABSTRACT

The invention relates to a method (50) in a base station (21) for handling handover of a user equipment (31) from the base station (21) to one of two or more target base stations (23, 25). The method (50) comprises the steps of: detecting (51) a physical cell identity confusion situation; initiating (52) handover preparations towards the two or more target base stations (23, 25) including conveying an information element to the two or more target base stations (23, 25); receiving (53) response messages from the two or more target base stations (23, 25), the response messages being based on the transmitted information element and thus being identical; transmitting (54) to the user equipment (31) a unique handover message, enabling the user equipment (31) to perform a handover to appropriate target base station (25). The invention also relates to base stations, computer programs and computer program products.

11 Claims, 6 Drawing Sheets

(56) References Cited

OTHER PUBLICATIONS

Author Unknown, "ETSI TR 136 902 V9.3.1 (May 2011)," LTE; Evolved Universal Terrestrial Radio Access Network (E-UTRAN); Self-Configuring and Self-Optimizing Network (SON) Use Cases and Solutions (3GPP TR 36.902 version 9.3.1 Release 9). May 2011. pp. 1-23.

Author Unknown, "Optimized Handover in the Presence of PCI Confusion," Qualcomm Europe. 3GPP TSG RAN WG2 62bis; Tdoc-R2-083268. Jun. 30-Jul. 4, 2008. pp. 1-5. Warsaw, Poland.

* cited by examiner

METHODS IN A BASE STATION FOR HANDLING HANDOVER, BASE STATION, COMPUTER PROGRAM AND COMPUTER PROGRAM PRODUCT

FIELD OF THE INVENTION

The invention relates to the field of handovers of user equipment between base stations in wireless communication systems, and in particular means and methods for handling physical cell identity confusion situations in such wireless communication systems.

BACKGROUND OF THE INVENTION

Heterogeneous networks (HetNets) are an appealing solution for providing increased capacity to mobile users. FIG. 1 illustrates such heterogeneous network 1, comprising a macro base station 2 providing a wide area coverage serving users within a macro cell 3, particularly for users moving at high speed. Within the macro cell 3 several low power nodes are employed in service areas having a higher density of users requiring high data rates, or hotspots as such areas are denoted. Examples of such low power nodes comprise pico base stations 5 within pico cells 6, relay base stations 8 providing relay cells 9 and femto/home base stations 4 covering femto cells 7. In the heterogeneous network thus, the macro base station 2 could be used for coverage and femto or pico base stations 4, 5 for capacity.

In communication systems, e.g. in the heterogeneous network, a physical cell identity (PCI) is used in a radio layer for identifying different cells within the communication system and in neighboring cell measurements and measurement reports. Global cell identities are mainly used in other layers, for example in handover routing. The total number of different PCIs is limited in various communication technologies. In Long Term Evolution (LTE) for example, primary and secondary synchronization signals together encode the different LTE cells' PCI, which is composed of the physical layer cell identity group (0, 1, . . . , 167) and the physical layer identity (0, 1 or 2). The total number of PCIs, in LTE, is thus 504.

Typically the PCI allocation is a demanding task in network planning in order to ensure that neighboring cells do not use same PCI. The PCI should be unique and enough for identifying the cell.

In HetNet deployment, the above may create specific issues, as the HetNet cells 5, 7, 9 also are identified by a PCI on the radio layer. In order to provide a unique PCI, some of the available different PCIs could be dedicated for HetNet cells 5, 7, 9. However, as the number of PCIs is limited it would be difficult to dedicate a suitable number of them to HetNet cells 5, 7, 9. This leads to a situation commonly known as "PCI confusion", which means that the use of only PCI is not enough to uniquely identify a cell, and a global cell identity (e.g. E-UTRAN Cell Global Identity, E-CGI) is required to uniquely identify the HetNet cell.

FIG. 2 illustrates an exemplary case of the above described PCI confusion. In this exemplary case there exists two different pico cells 11, 12 within the coverage area of the macro cell 14, and these pico cells have been configured with the same PCI, which is 101 in the illustrated case. When the user equipment (UE) 10 approaches a HetNet cell 11 it will indicate this to its serving macro base station 13 controlling a macro cell 14. This indication is conveyed in a measurement report and one included information element in this measurement report is the PCI (101). A "PCI confusion" situation may occur in the macro base station 13 and in the following some different possible scenarios are mentioned:

a) The macro base station 13 is not aware of the "PCI confusion" possibility and has stored neighbor relation for the PCI 101 towards the HetNet cell 12. In this case, any triggered handover towards the HetNet cell 12 will fail as the handover preparation was performed towards HetNet cell 12 and the UE 10 attempted to perform handover to HetNet cell 11.

b) The macro base station 13 is not aware of the "PCI confusion" possibility and has stored neighbor relation for the PCI 101 towards the HetNet cell 11. In this case, any triggered handover towards the HetNet cell 11 would anyhow succeed.

c) The macro base station 13 is aware of the "PCI confusion" possibility. In this case the macro base station 13 needs to ask the UE 10 to report more information that can be used for uniquely identifying the HetNet cell 11. One possibility is to use Automatic Neighbor Relation (ANR)-like principles to solve the PCI confusion.

d) The macro base station 13 is aware of the "PCI confusion" possibility and knows all cells 11, 12 with that particular PCI (101) and has stored neighbor relation lists for all of them. The macro base station 13 requests a handover preparation to all possible target cells 11, 12 and sends a handover command to the UE 10 for one of the cells, for example cell 12. When the UE 10 approaches cell 11 the plain handover will fail, but an RRC Re-establishment procedure will follow, so the service is resumed after only a short interruption. However, this method is only practical for cases in which there are only a few cells having the same PCI and it would often cause an interruption.

One known solution to this PCI confusion problem is thus to let the UE provide more information to the serving cell enabling it to uniquely identify the target cell, for example by applying principles similar to ANR. One such procedure is called "inbound mobility to E-UTRAN CSG cells" in 3GPP Technical Specification 36.300. However, "inbound mobility" has some drawbacks, particularly if used in every case when a PCI confusion might arise. The frequent use of 'inbound mobility' may create interruption in the ongoing transmission in the serving cell as the UE needs long gaps to read the E-CGI from the target cell. The use of 'inbound mobility' may also create delay in the handover process as the UE needs to retrieve additional information from the target cell. Further, the support of 'inbound mobility' may be implemented as an optional feature, resulting in that it would not be available for use with all UEs.

From the above, it is clear that there is a need for improvement in this regards.

SUMMARY OF THE INVENTION

An object of the invention is to provide a way of resolving the PCI confusion resulting in resource efficient and fast handovers.

The object is according to a first aspect of the invention achieved by a method in a base station for handling handover of a user equipment from the base station to one of two or more target base stations. The method comprises the steps of: detecting a physical cell identity confusion situation; initiating handover preparations towards the two or more target base stations including conveying an information element to the two or more target base stations; receiving response messages from the two or more target base stations, the response messages being based on the transmitted information element and thus being identical; transmitting to the user equipment a unique handover message, enabling the user equipment to perform a handover to appropriate target base station.

The invention provides a network based solution for overcoming problems related to the PCI confusion in a HetNet scenario, which is faster and more resource efficient than known handover methods. In addition, the invention improves the service experience for the end users, as the need for long gaps in the transmission with the serving cell is removed.

In an embodiment, the method comprises the further steps of receiving, from one of the target base stations, a message indicating a successful handover; and cancelling the handover preparations towards remaining target base stations. Candidate target base stations that turn out not to be the correct target base station are thereby alleviated from further processing of the handover procedure.

In an embodiment, the step of detecting a physical cell identity confusion situation comprises receiving a measurement report from the user equipment including a physical cell identity; and identifying in a neighbor relation list multiple entries for the physical cell identity. The use in the base station of a neighbor relation list allowing multiple entries for each radio level identity, i.e. physical identity confusion, enables a reliable way of detecting physical identity confusion situations.

In an embodiment, the step of initiating handover preparations towards the two or more target base stations comprises transmitting to the two or more target base stations a handover request message including the information element.

In an embodiment, the received response messages comprise identical radio resource control connection reconfiguration messages.

In an embodiment, the information element comprises a cell radio network temporary identifier, security settings, antenna configuration information, dedicated random access parameters or uplink Sounding configuration. Several options are thus available for the base station to enable the target base stations to create and transmit identical response messages.

In an embodiment, the information element comprises a cell radio network temporary identifier chosen from within a range of cell radio network temporary identifier values dedicated for use upon detection of physical cell identity confusion.

In the above embodiment, the use of the range of dedicated cell radio network temporary identifier values may be negotiated between the base station and a neighboring base station.

In an embodiment, the base station comprises a base station serving an overlaid cell in a layered communication system and the one or more target base stations comprise base stations serving underlaid cells of the layered communication system, the underlaid cells having coverage areas at least partly overlapping with the coverage area of the overlaid cell. The method is well suited for use in e.g. heterogeneous networks, comprising e.g. macro base station having within its coverage area low power nodes.

The object is according to a second aspect of the invention achieved by a base station for handling handover of a user equipment from the base station to one of two or more target base stations, the base station comprising a controller arranged to: detect a physical cell identity confusion situation, and initiate handover preparations towards the two or more target base stations including conveying an information element to the two or more target base stations; an input/output device arranged to: receive response messages from the two or more target base stations, the response messages being based on the transmitted information element and thus being identical, and transmit to the user equipment a unique handover message, enabling the user equipment to perform a handover to appropriate target base station.

The object is according to a third aspect of the invention achieved by a computer program for a base station for handling handover of a user equipment from the base station to one of two or more target base stations. The computer program comprises computer program code, which, when run on the base station, causes the base station to perform the steps of: detecting a physical cell identity confusion situation; initiating handover preparations towards the two or more target base stations including conveying an information element to the two or more target base stations; receiving response messages from the two or more target base stations, the response messages being based on the transmitted information element and thus being identical; transmitting to the user equipment a unique handover message, enabling the user equipment to perform a handover to appropriate target base station.

The object is according to a fourth aspect of the invention achieved by a computer program product comprising a computer program as above, and a computer readable means on which the computer program is stored.

The object is according to a fifth aspect of the invention achieved by a method in a base station for handling handover of a user equipment from the base station to one of two or more target base stations. The method comprises the steps of detecting a physical cell identity confusion situation; initiating handover preparations towards the two or more target base stations; receiving response messages from the two or more target base stations; creating a container comprising the received response messages; and transmitting to the user equipment the container comprising the received response message, enabling the user equipment to perform a handover to a selected target base station.

Further features and advantages thereof will become clear upon reading the following description and the accompanying drawings.

DETAILED DESCRIPTION OF EMBODIMENTS

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail. Like numbers refer to like elements throughout the description.

Figure 1:
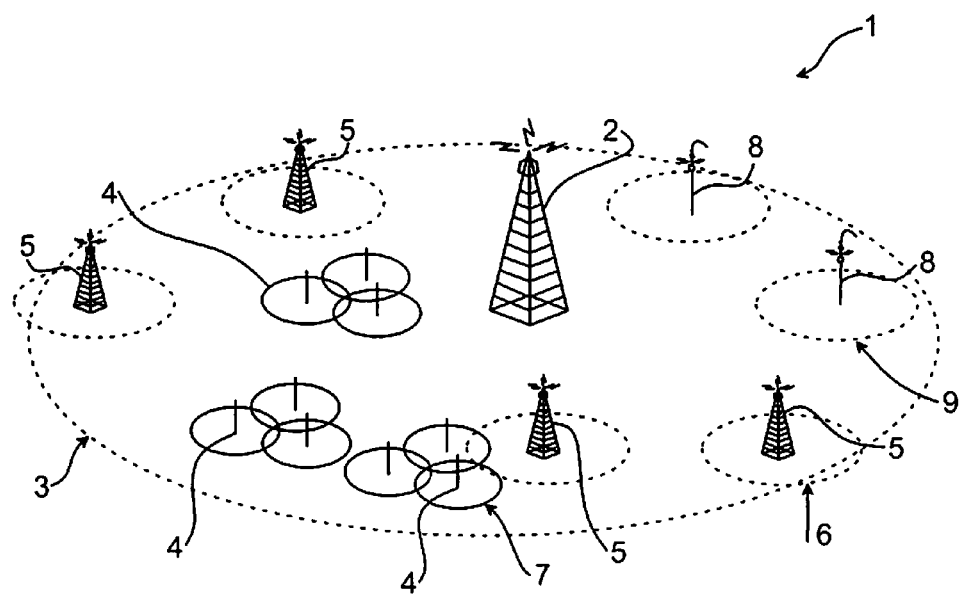
FIG. 1 illustrates a heterogeneous network.
Figure 2:
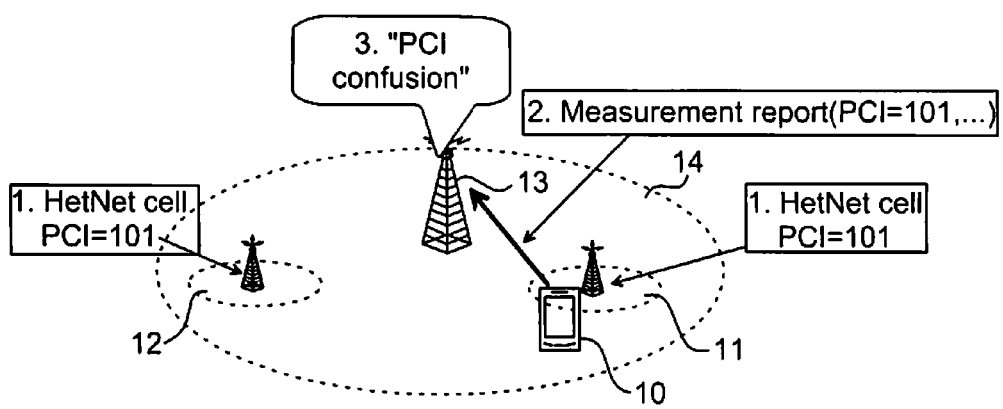
FIG. 2 illustrates a PCI confusion situation.
Figure 3:
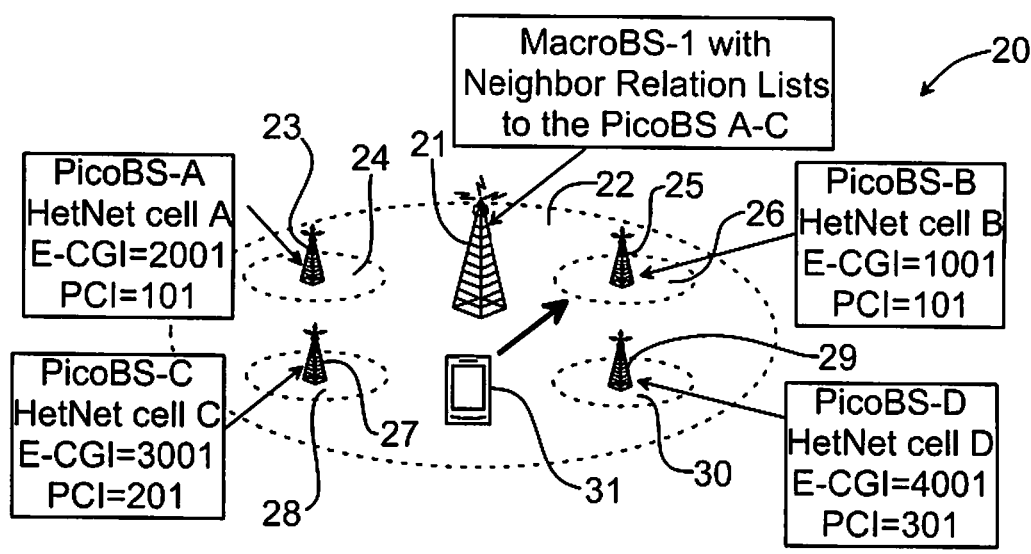
FIG. 3 illustrates schematically an environment in which embodiments of the invention may be implemented, and also another exemplifying PCI confusion scenario.

FIG. 3 illustrates schematically an environment in which embodiments of the invention may be implemented. The invention could for example be implemented in a layered communication system comprising base stations serving overlaid cells and additional base stations serving underlaid cells. The underlaid cells have coverage areas at least partly overlapping with the coverage area of the overlaid cells. In particular, in FIG. 3 a heterogeneous network 20 is illustrated. The heterogeneous network 20 comprises a base station 21 in a macro cell 22 serving users, e.g. user equipment 31, located within its coverage area. In the following description the base station 21 will be exemplified by a macro base station.

The heterogeneous network 20 further comprises a number of pico cells 24, 26, 28, 30 with a respective pico base station 23, 25, 27, 29. The pico cells would correspond to the above mentioned underlaid cells, and will be used as an example of low power nodes in the following description when describing aspects of the invention.

FIG. 3 also illustrates another exemplifying PCI confusion scenario. The pico base stations 23 and 25 have the same PCI (101) configured. All pico base stations have unique E-CGI (2001, 1001, 3001, 4001). The UE 31 is shown located in the macro cell 22 and is served by the macro base station 21.

The macro base station 21 maintains a modified Neighbor Relation List (NRL), which allows multiple entries for each radio level identity. In this case PCI is the relevant radio level identity.

When building the neighbor relation list, either the macro base station 21 or the pico base stations 23, 25, 27, 29 may also automatically build corresponding X2-interfaces, based on known procedures. A mechanism to maintain the neighbor relation lists may be the existing Automatic Neighbor Relation, other operation and maintenance procedures or that the pico base stations 23, 25, 27, 29 contain UE receivers to scan the surrounding macro base station coverage and then use the retrieved information to automatically establish X2-interfaces to the macro base station 21. The current neighbor relation list in the macro base station 21 may for example comprise entries for pico base station 23, 25 and 27, while pico base station 29 has not yet been added to the neighbor relation list.

In this example, the UE 31 shown in the FIG. 3 approaches pico cell 26 (indicated at the arrow), and sends measurement report to the macro base station 21 indicating PCI 101. Once the macro base station 21 decides that it is time to trigger a handover (based e.g. on conventional received signal strength indication, RSSI, measurements), it also detects that this is a PCI confusion case as the neighbor relation list contains two different entries for the indicated PCI (pico base stations 23 and 25, both having PCI 101).

In an alternative embodiment, the detection of the possibility for PCI confusion comprises using a separate PCI value range for the pico base stations 23, 25, 27, 29 when the PCI confusion is possible. For example, a specific value range, e.g. the values between 100 and 149, could be allocated for the pico base stations and in this case, the detection of the possibility for PCI confusion is based on the macro base station being configured with this PCI range information and when receiving a PCI within the PCI range, a PCI confusion is detected. However, in this example, the macro base station 21 has multiple Neighbor Relations for the same PCI.

The macro base station 21 thus triggers handover preparation phase towards both the pico base station 23 and pico base station 25 as it doesn't know which of these pico base stations 23, 25 the UE 31 is approaching. Once the macro base station 21 receives the responses to the handover preparation from both pico base stations 23, 25, it sends a single RRCConnection-Reconfiguration message to the UE 31. The UE 31 will then access the correct target pico base station 25 based on the information received in RRCConnection-Reconfiguration message and the handover execution is completed.

Once the macro base station 21 receives an indication to release the UE 31 context from the pico base station 25, it can also cancel the handover preparation phase towards the other pico base station 25.

Figure 4:
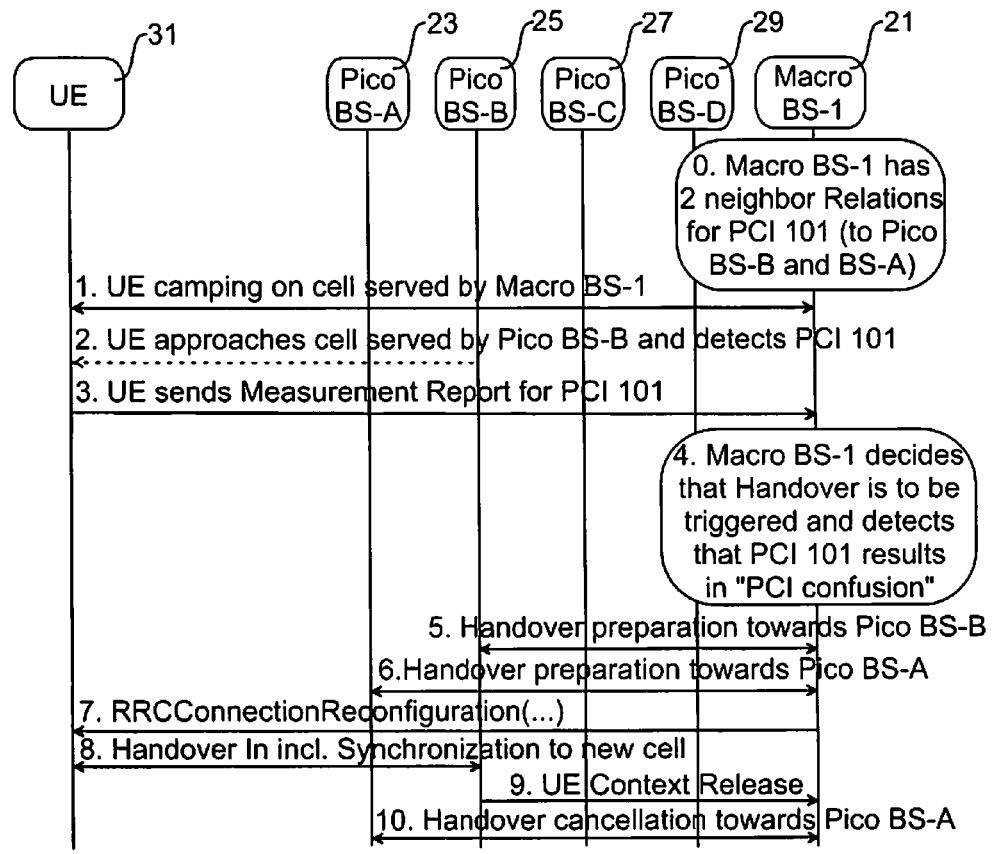
FIG. 4 is a sequence diagram illustrating handover procedure at PCI confusion.

FIG. 4 is a sequence diagram illustrating the above handover procedure at PCI confusion. The UE 31 is served by the macro base station 21 (arrow 1) and relevant signaling between them is performed, e.g. UE 31 transmitting traffic data to the macro base station 21. The UE 31 approaches the cell 26 served by the target pico base station 25 and detects the PCI (101) broadcast by the pico base station 25 (arrow 2). The macro base station 21 then receives measurement report for PCI 101 from the UE 31 (arrow 3) and decides that handover is to be triggered. The macro base station 21 detects that PCI 101 results in PCI confusion (box 4). The target pico base stations 23 and 25 and the macro base station 21 exchange handover preparation signaling and the pico base stations 23, 25 build RRCConnectionReconfiguration messages, which they transmit to the macro base station 21 and that are then forwarded to the UE 31 by the macro base station 21 (arrow 7). Only a single RRCConnectionReconfiguration message is sent to the UE 31 but the target pico base stations 23, 25 independently build two separate such messages.

A legacy method to handle this situation is that even when multiple targets are prepared for handover only a single RRCConnectionReconfiguration message is forwarded to the UE. The handover would fail if approaching a different base station than the one composing the received RRCCo- nnectionReconfiguration message. The UE would then attempt an RRC re-establishment procedure, which would succeed if the approached base station was also 'prepared' for handover. The user would perceive a somewhat longer interruption (in the order of a few 100 ms).

Two different solutions will be described for handling of the RRCConnectionReconfiguration messages. A first solution is based on that the source base station (macro base station 21) provides the needed instructions to the different target nodes (pico base stations 23, 25) so that these can create the same RRCConnectionReconfiguration message which is then forwarded to the UE 31. A second solution is based on that all the different RRCConnectionReconfiguration messages are provided to the UE 31 which then attempts to access the target cell based on information in the different messages (one by one). It can be noted that the "intended" target cell 26 may reject the handover preparation for example due to an overload situation, but the source base station 21 obviously doesn't know which of the potential target cells 24, 26 is the "intended" one. Hence the UE 31 may receive a handover command and access the overloaded cell. One way of mitigating the effects of this is that a new 'rejection indication' criterion is defined to trigger RRC re-establishment. There are then chances that the UE 31 may revert back to the original macro cell 22. Alternatively pico cells should always, or to greatest possible extent, accept an incoming handover from a macro cell.

The first solution is thus based on that the source base station (macro base station 21) provides the needed instructions to the different target nodes (pico base stations 23, 25) so that these can create the same RRCConnectionReconfiguration message, which is then forwarded to the UE 31 by the macro base station 21.

Two different examples of information that the target side, i.e. pico base stations 23, 25 would normally allocate are a new dedicated cell radio network temporary identifier (C-RNTI) user identity and new security settings. These information elements are used here only as an example and the same principles can also be used for other information elements that would typically be allocated by the target base stations.

The C-RNTI handling is as following. A separate value range of the C-RNTI values is allocated for handover purposes in the case of "PCI confusion". In the basic case it is enough that the special C-RNTI value range is unique within a macro cell as it controls all its own PCI confusions towards all the pico cells 24, 26, 28, 30 located within its coverage area 22. The source macro base station 21 allocates one of these values and sends this value to the target pico base stations 23, 25, i.e. those having the same PCI. The target pico base stations 23, 25 then includes the C-RNTI value in the RRCConnection Reconfiguration message that they each build. Since the same C-RNTI value is forwarded to all target nodes, i.e. pico base stations 23, 25, the RRCConnectionReconfiguration messages created by them are identical. This unique message is then transmitted to the UE 31 by the macro base station 21.

Figure 5:
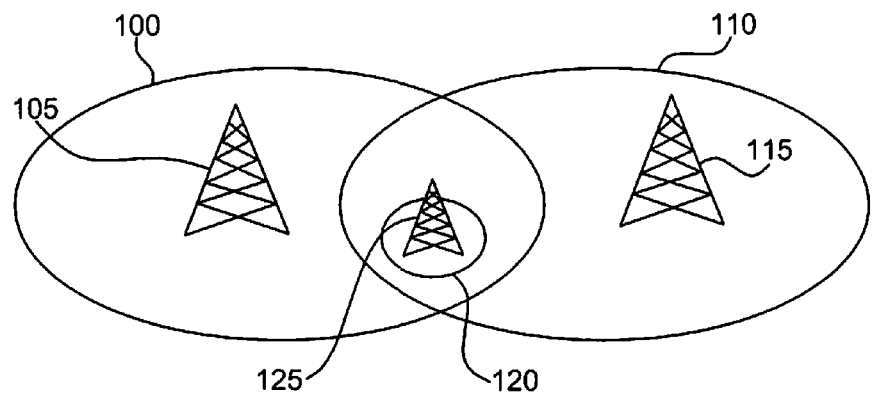
FIG. 5 illustrates two macro base stations and a pico base station lying within the overlapping coverage areas of the two macro base stations.

However, the special C-RNTI value range needs additional considerations in the case when a pico base station with PCI confusion is placed in the overlapping border of two macro cells. FIG. 5 illustrates such case, i.e. two macro base stations 105, 115 and a pico base station 125 lying within the overlapping coverage areas 100, 110 of the two macro base stations 105, 115.

In this case, both macro cells 100, 110 could theoretically allocate the same special C-RNTI value if there would simultaneously be a PCI confusion handover from both the macro cells 100, 110 towards any of the pico cells (not illustrated) with the same PCI value within each macro cell 100, 110. The likelihood for this is low, since the PCI confusion handovers are short-lived, but the likelihood can still be decreased by having relatively large special C-RNTI value ranges. However, this C-RNTI collision during PCI confusion handover is possible and to avoid it totally additional measures are needed, which will be described next.

One possibility is to allocate (e.g. by operation and maintenance) different special C-RNTI value ranges for any macro base stations 105, 115 with overlapping coverage areas 100, 110. Another possibility is to have a more dynamic handling of this case between the macro base stations 105, 115. For example, when two macro base stations 105, 115 (or any single one of these) detect that there is a pico cell with possible PCI confusion then the macro base stations 105, 115 can dynamically negotiate special conditions for the special C-RNTI range. One particular example is that when a pico cell 120 with PCI value 1001 is detected as an overlapping cell to both macro cells 100, 110 then the macro base stations 105, 115 negotiate that for example macro base station 105 is only allowed to use e.g. 50 (depending on how many simultaneous PCI Confusion handovers are to be supported) C-RNTI values of the total range for the PCI value 1001 and that macro base station 115 is not allowed to use any of these values in PCI Confusion handover for PCI value 1001.

A pico cell 120 can be detected as an overlapping cell to multiple macro cells 100, 110 based on the following logic:
1. The macro base station has an X2-interface to all the known pico base stations in its coverage area. In the first phase a first macro base station selects the pico base stations that are candidates or known "PCI confusion" cells. The PCI of the pico base stations are known using cell identities, including PCIs, stored internally in the first macro base station.
2. The first macro base station inquires the pico base stations over the X2-interface which other macro cells each pico base station can detect. The result becomes multiple sets of macro cells and is returned to the first macro base station from each pico base station separately. The communication about the information can alternatively be triggered from the pico base station without the first macro base station explicitly asking for this information. It can be performed already as part of the X2-interface establishment or during update of information initially exchanged during the interface establishment. An example of this is the eNB Configuration Update procedure.
3. The first macro base station now knows which PCIs are candidates for or known "PCI confusion" cells. It also knows which other macro cells have overlapping coverage with each pico cell known by PCI. The next step is that the first macro base station contacts each of the other macro base stations having overlapping coverage areas with the pico cells to check if these cells also have the same PCI as a candidate or are known for "PCI confusion".
4. Now the first macro base station has identified the different pairs of {confused PCI, macro base station} and the negotiations for C-RNTI value handling can be started as exemplified above. It is also important to understand that such C-RNTI negotiation is needed only when both macro base stations identify the PCI as a candidate for PCI confusion. If only one of the macro base stations have PCI confusion, then the macro base station would anyhow be using different C-RNTI ranges and there would be no risk for the "C-RNTI collision".

Still another variant for the above steps is the following:
1. The first macro base station knows its other macro base station neighbors. The first macro base station also knows the PCI values that are candidates for or known for "PCI confusion".
2. The first macro base station contacts all the neighboring macro base stations to find out which other macro cells have the same PCI confusion values. Once this is done the negotiations for C-RNTI value handling can be started as exemplified above.

The main difference to the above first variant is that more C-RNTI negotiations will be performed as the detection is not really based on a pico base station providing coverage in an overlapping area to both macro cells. This could however be no issue if the number of "PCI confusions" in each macro cell is not large.

Yet another possibility: At X2 establishment an RNTI allocation negotiation takes place. Pico cells are somehow defined as such and they allocate a range of "handover RNTIs" to each macro cell. If new macro neighbors appear, then the affected pico cell will repeat the RNTI allocation to the "old" macro cell neighbor. Macro cells are assumed not to suffer from PCI confusion.

The new security settings in the target cell can be either allocated before or after the handover. One example for the handling of these is that the source side (referring to FIG. 3, this would be the macro base station 21) instructs the target base stations (pico base stations 23, 25) not to activate any new security settings before the handover. Instead, these will be activated afterwards, when the UE 31 is already communicating with the target pico base station 25. The UE 31 will be informed about this in the handover command, i.e. not to apply the currently standardized 'key derivation' and continue security procedures. Another example for the handling of the security settings is to apply similar handling as above for the C-RNTI, i.e. that the source base station would allocate the new security settings and forward these to the target base stations.

The general idea of creating the same handover command for all potential target cells is limited if different targets have different capabilities. This can be solved by defining a basic capability and that the source tells target cells to use the basic capability in case of multiple preparations. The knowledge about target cell capabilities can be either configured or learnt via (updated) X2-signalling.

The second solution, based on the existing prior art handling of handover preparation and multiple handover preparations, will be described next. Once the source base station has received responses to all the handover preparations, it creates a new container that can include several of the different RRCConnectionReconfiguration messages received from the different target sides. The new container with multiple RRCConnection-Reconfiguration messages is then sent to the UE 31.

The UE 31 will then synchronize with the target base station and attempt to access the target base station based on information in the different messages. This can be performed using existing handover principles and the UE 31 repeats the handover access attempt towards the target base stations until the target base station accepts the handover access. The maximum number of repetitions is the number of different RRCConnection-Reconfiguration messages received.

The above basic variant can be optimized in different ways. For example, the new container with multiple RRC-Connection-Reconfiguration messages could also be coded in an optimized way so that only information that changes is repeated and constant information is provided only once.

Another optimized way would be in the handover access and that the handover access signaling from the UE 31 to the macro base station 21 is enhanced to include a table of all the different "handover reference numbers" (for example Random Access Preambles and/or C-RNTIs) from the different RRCConnection-Reconfiguration messages. Once the macro base station 21 receives the table, it can indicate to the UE 31 which one(s) is/are to continue the handover access signaling.

Figure 6:
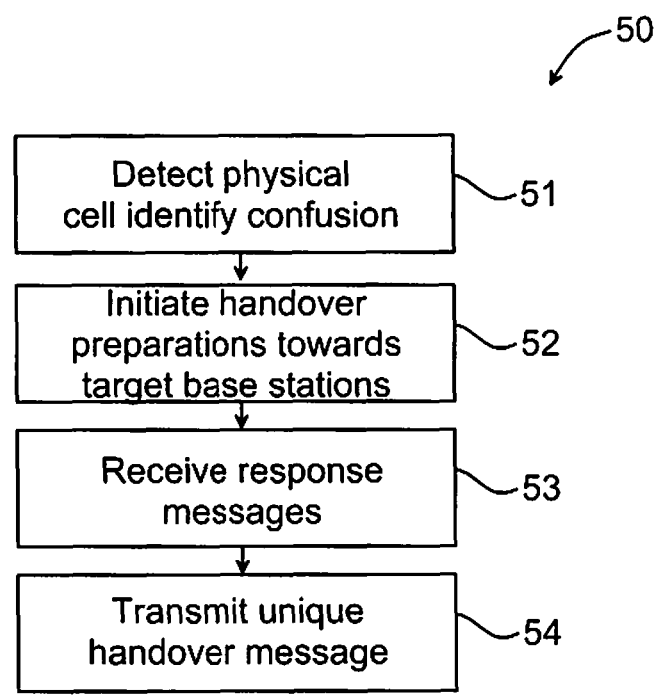
FIG. 6 illustrates steps of a method in an aspect of the invention.

FIG. 6 illustrates a flow chart of steps of a method in accordance with one aspect of the invention. The method 50 may be implemented in the base station 21 for handling handover of the user equipment 31 from the base station 21 to one of two or more target base stations 23, 25. The method 50 comprises the first step of detecting 51 a physical cell identity confusion situation.

The method 50 comprises the second step of initiating 52 handover preparations towards the two or more target base stations 23, 25. The handover preparations comprise at least conveying an information element to the two or more target base stations 23, 25. The initiation of handover preparations may comprise transmitting to the two or more target base stations 23, 25 a handover request message including the information element. The information element may for example comprise a cell radio network temporary identifier, security settings, antenna configuration information (in LTE AntennaInfoCommon), specify dedicated random access parameters (in LTE RACH-ConfigDedicated) or specify the uplink Sounding configuration (sounding reference signals). It is realized that there are several other information elements that could be used and that the information element could be chosen differently depending on the communication system at hand.

The method 50 comprises the third step of receiving 53 response messages from the two or more target base stations 23, 25, the response messages being based on the transmitted information element and thus being identical. The received response messages may for example comprise identical radio resource control connection reconfiguration messages (RRCConnectionReconfiguration) transmitted by all the base stations having the identical PCI.

The method 50 comprises the fourth step of transmitting 54 to the user equipment 31 a unique handover message, enabling the user equipment 31 to perform a handover to appropriate target base station 25.

Figure 7:
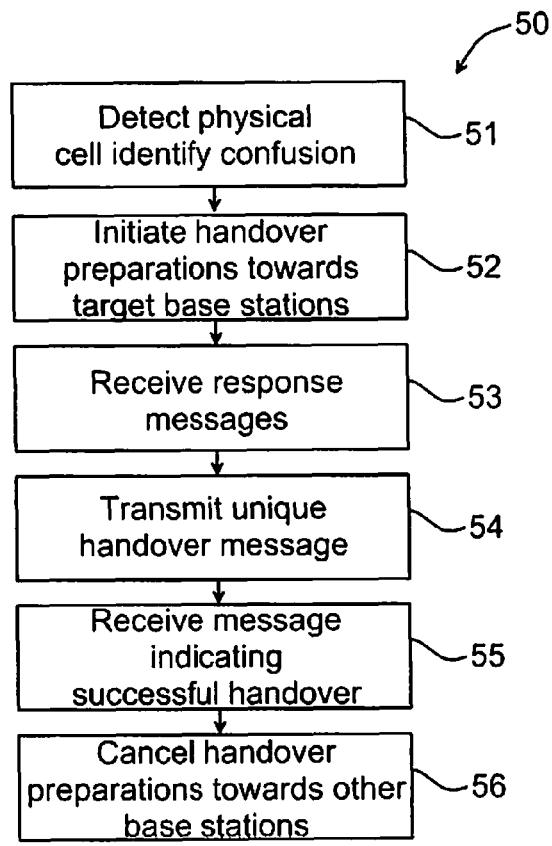
FIG. 7 illustrates an embodiment of the method in FIG. 6.

In an embodiment, illustrated in FIG. 7, the method 50 comprises the further steps of: receiving 55, from one of the target base stations 25, a message indicating a successful handover. The base station 21 then cancels 56 the handover preparations towards remaining target base stations 23.

Figure 8:
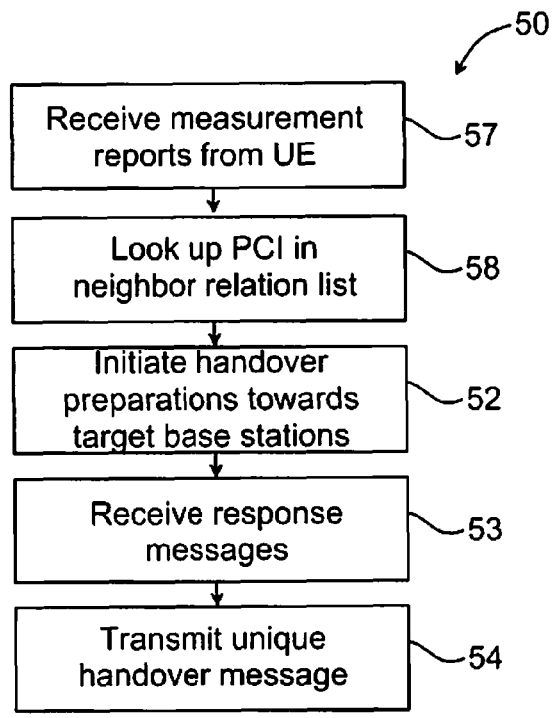
FIG. 8 illustrates another embodiment of the method in FIG. 6.

In an embodiment, illustrated in FIG. 8, the step of detecting a PCI situation comprises the sub-steps of the base station 21 receiving 57 a measurement report from the user equipment 31, the measurement report including a physical cell identity. The base station 21 is arranged to look up the physical cell identity in a neighbor relation list and identify 58 therein multiple entries for this particular physical cell identity, thus detecting that there is a physical cell identity confusion situation.

In an embodiment, the information element comprises a cell radio network temporary identifier (C-RNTI) chosen from within a range of cell radio network temporary identifier values dedicated for use upon detection of the physical cell identity confusion. The use of the range of dedicated C-RNTI values may be negotiated between the base station 21 and a macro neighboring base station. This situation has been described more in detail earlier.

Figure 9:
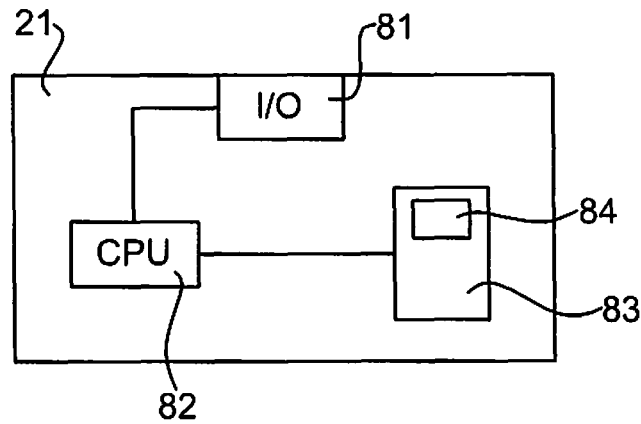
FIG. 9 illustrates a base station of an aspect of the invention.

The invention also encompasses the base station 21. FIG. 9 illustrates the macro base station 21 and in particular means for implementing the described methods. The macro base station 21 comprises a processor 82, e.g. a central processing unit, microcontroller, digital signal processor (DSP), etc., capable of executing software instructions stored in a computer program product 83 e.g. in the form of a memory. The processor 82 is connected to an input/output device 81 that receives inputs from user equipment 31, typically via some other device, e.g. a transceivers, of the base station 21. It is noted that although only one processor 82 is illustrated in FIG. 6, the implementation may comprise distributed hardware so that several CPUs are used rather than one when running the software.

The described methods and algorithms or parts thereof for use in handling handover may be implemented e.g. by software and/or application specific integrated circuits in the processor 82. To this end, the macro base station 21 may further comprise a computer program 84 stored on a computer program product 83.

With reference still to FIG. 9, the invention also encompasses such computer program 84 for handling handovers. The computer program 84 comprises computer program code which when run on the macro base station 21, and in particular the processor 82 thereof, causes the macro base station 21 to perform the methods as described.

A computer program product 83 is also provided comprising the computer program 84 and computer readable means on which the computer program 84 is stored. The computer program product 83 can be any combination of read and write memory (RAM) or read only memory (ROM). The computer program product 83 may also comprise persistent storage, which, for example can be any single one or combination of magnetic memory, optical memory, or solid state memory.

Figure 10:
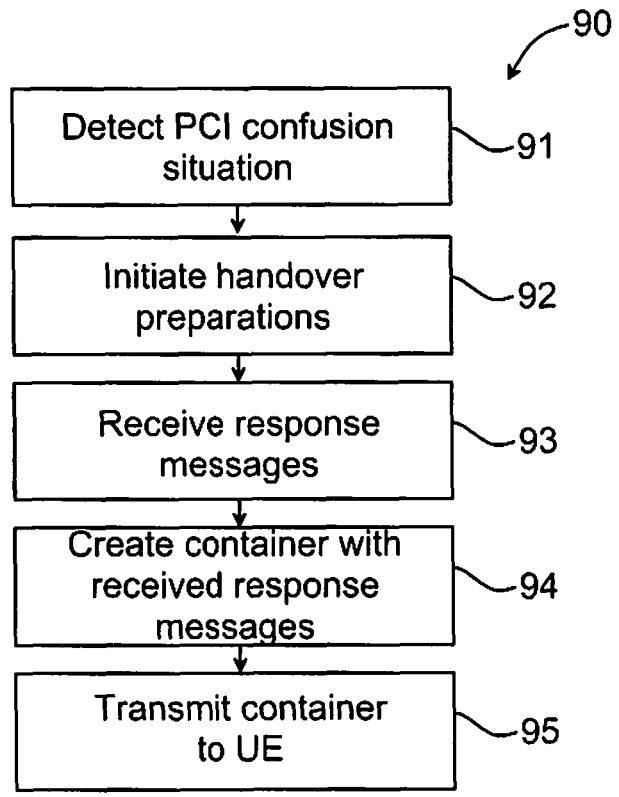
FIG. 10 illustrates steps of another method in an aspect of the invention.

FIG. 10 illustrates a flow chart over steps of a method implementing the second solution as described earlier. The method 90 is performed in the base station 21 and enables the handling of handover of the user equipment 31 from the base station 21 to one of two or more target base stations, i.e. pico base stations 23, 25. The method 90 comprises the first step of detecting 91 a physical cell identity confusion situation.

The method 90 comprises the second step of initiating 92 handover preparations towards the pico base stations 23, 25.

The method 90 comprises the third step of receiving 93 response messages from the pico base stations 23, 25.

The method 90 comprises the fourth step of creating 94 a container comprising the received response messages.

The method 90 comprises the fifth step of transmitting 95 to the user equipment 31 the container comprising the received response message, enabling the user equipment 31 to perform a handover to a selected target pico base station 25.

The invention claimed is:

1. A method in a base station for handling handover of a user equipment from the base station to one of two or more target base stations, the method comprising the steps of:
   detecting a physical cell identity confusion situation,
   initiating handover preparations towards the two or more target base stations including conveying an information element to the two or more target base stations,
   receiving response messages from the two or more target base stations, the response messages being based on the transmitted information element and comprising identical radio resource control connection reconfiguration messages, and thus being identical,
   transmitting to the user equipment a unique handover message, enabling the user equipment to perform a handover to appropriate target base station.

2. The method as claimed in claim 1, comprising the further steps of:
   receiving, from one of the target base stations, a message indicating a successful handover, and
   cancelling the handover preparations towards the remaining target base stations.

3. The method as claimed in claim 1, wherein the step of detecting the physical cell identity confusion situation comprises:
   receiving a measurement report from the user equipment including a physical cell identity, and
   identifying in a neighbor relation list multiple entries for the physical cell identity.

4. The method as claimed in claim 1, wherein the step of initiating handover preparations towards the two or more target base stations comprises transmitting to the two or more target base stations a handover request message including the information element.

5. The method as claimed in claim 1, wherein the information element comprises a cell radio network temporary identifier, security settings, antenna configuration information, dedicated random access parameters or Sounding configuration.

6. The method as claimed in claim 1, wherein the information element comprises a cell radio network temporary identifier chosen from within a range of cell radio network temporary identifier values dedicated for use upon detection of physical cell identity confusion.

7. The method as claimed in claim 6, wherein the use of the range of dedicated cell radio network temporary identifier values is negotiated between the base station and a neighboring base station.

8. The method as claimed in claim 1, wherein the base station comprises a base station serving an overlaid cell in a layered communication system and the one or more target base stations comprise base stations serving underlaid cells of the layered communication system, the underlaid cells having coverage areas at least partly overlapping with coverage area of the overlaid cell.

9. A base station for handling handover of a user equipment from the base station to one of two or more target base stations, the base station comprising:
   a controller arranged to:
      detect a physical cell identity confusion situation,
      initiate handover preparations towards the two or more target base stations including conveying an information element to the two or more target base stations,
   an input/output device arranged to:
      receive response messages from the two or more target base stations, the response messages being based on the transmitted information element and comprising identical radio resource control connection reconfiguration messages, and thus being identical,
      transmit to the user equipment a unique handover message, enabling the user equipment to perform a handover to appropriate target base station.

10. A non-transitory computer-readable medium storing a computer program for a base station for handling handover of a user equipment from the base station to one of two or more target base stations, the computer program comprising computer program code, which, when run on the base station, configures the base station to:
   detect a physical cell identity confusion situation,
   initiate handover preparations towards the two or more target base stations including conveying an information element to the two or more target base stations,
   receive response messages from the two or more target base stations, the response messages being based on the transmitted information element and comprising identical radio resource control connection reconfiguration messages, and thus being identical,
   transmit to the user equipment a unique handover message, enabling the user equipment to perform a handover to appropriate target base station.

11. A method in a base station for handling handover of a user equipment, the method comprising:
   receiving a physical cell identity from the user equipment, identifying a handover target for the user equipment;
   detecting that the physical cell identity is associated with two or more other base stations, and wherein the base station does not know which one of the two or more other base stations is the handover target;

initiating handover preparations with each one of the other base stations, as if each other base station was the handover target;

receiving response messages from each one of the other base stations, the response messages being based on information received by the other base stations during handover preparations, wherein the received response messages comprise identical radio resource control connection reconfiguration messages, and thus are identical, and transmitting to the user equipment a unique handover message, enabling the user equipment to perform a handover to a selected one of the other base stations.

\* \* \* \* \*